(12) United States Patent
Garduno Ramirez et al.

(10) Patent No.: US 12,238,845 B2
(45) Date of Patent: Feb. 25, 2025

(54) SYSTEMS AND METHODS FOR HEATING WINDSHIELD CAMERA VIEWING ZONES

(71) Applicant: FORD GLOBAL TECHNOLOGIES, LLC, Dearborn, MI (US)

(72) Inventors: Genaro Garduno Ramirez, Mexico City (MX); Nohemi Elizabeth Alvarez Mendez, Mexico City (MX)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1121 days.

(21) Appl. No.: 17/108,150

(22) Filed: Dec. 1, 2020

(65) Prior Publication Data

US 2022/0174792 A1   Jun. 2, 2022

(51) Int. Cl.
*H05B 6/10* (2006.01)
*B60R 11/04* (2006.01)
*B60S 1/02* (2006.01)
*H05B 3/86* (2006.01)

(52) U.S. Cl.
CPC ............... *H05B 6/10* (2013.01); *B60R 11/04* (2013.01); *B60S 1/026* (2013.01); *H05B 3/86* (2013.01); *H05B 2203/016* (2013.01)

(58) Field of Classification Search
CPC .. B60R 11/04; B60R 2011/0026; B60S 1/026; H05B 2203/008; H05B 2203/016; H05B 3/86; H05B 6/10; H05B 6/105
See application file for complete search history.

(56) References Cited

U.S. PATENT DOCUMENTS

| | | |
|---|---|---|
| 8,546,729 B2 | 10/2013 | Derda |
| 9,395,538 B2 | 7/2016 | Hui et al. |
| 10,645,761 B2 | 5/2020 | Schall et al. |
| 2020/0189523 A1* | 6/2020 | Dworakowski ........ H05B 6/105 |
| 2021/0059022 A1* | 2/2021 | Sadakane .......... B32B 17/10165 |

FOREIGN PATENT DOCUMENTS

JP    2004262320 A    9/2004

* cited by examiner

*Primary Examiner* — Dana Ross
*Assistant Examiner* — James F Sims, III
(74) *Attorney, Agent, or Firm* — Vichit Chea; Carlson, Gaskey & Olds, P.C.

(57) ABSTRACT

This disclosure details windshield heating systems for induction heating windshield camera viewing zones. An exemplary windshield heating system may include a first inductive heating element imbedded within a thermoplastic layer of the windshield and a second inductive heating element mounted between a glass layer of the windshield and a camera bracket. The first and second inductive heating elements establish a wireless connection for heating the camera viewing zone of the windshield.

20 Claims, 3 Drawing Sheets

SYSTEMS AND METHODS FOR HEATING WINDSHIELD CAMERA VIEWING ZONES

TECHNICAL FIELD

This disclosure relates to heating systems for motor vehicles, and more particularly to windshield heating systems for induction heating windshield camera viewing zones.

BACKGROUND

Some motor vehicles are equipped with windshield-mounted camera systems for capturing images outside of the vehicle. The camera systems may be used, for example, for alerting vehicle drivers when they are driving too close to other vehicles or objects. The windshield must be maintained clear from condensation (e.g., fog, frost, ice, etc.) in order to provide a clear viewing zone for enabling the camera system to capture images outside of the vehicle.

SUMMARY

A windshield heating system for a motor vehicle according to an exemplary aspect of the present disclosure includes, among other things, a windshield including a first glass layer, a second glass layer, and a thermoplastic layer between the first and second glass layers. A first inductive heating element is imbedded within the thermoplastic layer and a second inductive heating element is positioned at an interior surface of the second glass layer. The first and second inductive heating elements establish a wireless connection for heating a camera viewing zone of the windshield.

In a further non-limiting embodiment of the foregoing windshield heating system, the thermoplastic layer is a polyvinyl butyral (PVB) layer.

In a further non-limiting embodiment of either of the foregoing windshield hearing systems, the thermoplastic layer is an ethylene-vinyl acetate (EVA) layer.

In a further non-limiting embodiment of any of the foregoing windshield heating systems, the first inductive heating element includes a wire pattern imbedded within the thermoplastic layer.

In a further non-limiting embodiment of any of the foregoing windshield heating systems, the wire pattern includes a fine wire, a printed wire, or a wire coil.

In a further non-limiting embodiment of any of the foregoing windshield heating systems, the wire pattern is arranged within a pocket formed inside the thermoplastic layer.

In a further non-limiting embodiment of any of the foregoing windshield heating systems, the wire pattern is sandwiched between a first sublayer and a second sublayer of the thermoplastic layer.

In a further non-limiting embodiment of any of the foregoing windshield heating systems, a control module is configured to regulate a temperature at the camera viewing zone of the windshield by adjusting a current flow through an inductive coil of the second inductive heating element.

In a further non-limiting embodiment of any of the foregoing windshield heating systems, the second inductive heating element includes an induction coil received between the interior surface of the second glass layer and a camera bracket.

In a further non-limiting embodiment of any of the foregoing windshield heating systems, the induction coil is received over a cone portion of the camera bracket.

In a further non-limiting embodiment of any of the foregoing windshield heating systems, the induction coil is trapezoidal shaped.

In a further non-limiting embodiment of any of the foregoing windshield heating systems, a wire pattern of the first inductive heating element is arranged to include a shape that mimics that of the induction coil.

In a further non-limiting embodiment of any of the foregoing windshield heating systems, a sensor system is configured to monitor a temperature associated with the windshield or ambient air surrounding the windshield, and a control module is configured to adjust a current flow through the second inductive heating element based on the temperature.

In a further non-limiting embodiment of any of the foregoing windshield heating systems, the control module includes a pulse width modulation (PWM) circuit adapted for controlling the flow of power from a power supply to an induction coil of the second inductive heating element.

In a further non-limiting embodiment of any of the foregoing windshield heating systems, a DC-AC inverter operably connects the power supply to the second inductive heating element.

A vehicle according to another exemplary aspect of the present disclosure includes, among other things, a windshield including a first glass layer that faces toward an exterior of the vehicle, a second glass layer that faces toward an interior of the vehicle, and a thermoplastic layer disposed between the first and second glass layers. A first inductive heating element is imbedded within the thermoplastic layer, a second inductive heating element is positioned between an interior surface of the second glass layer and a camera bracket, and a camera is mounted to the camera bracket. The first and second inductive heating elements establish a wireless connection for heating a camera viewing zone of the windshield.

In a further non-limiting embodiment of the forgoing method of the vehicle, the thermoplastic layer is a polyvinyl butyral (PVB) layer or an ethylene-vinyl acetate (EVA) layer.

In a further non-limiting embodiment of either of the foregoing vehicles, the first inductive heating element includes a wire pattern that is overmolded by the thermoplastic layer and arranged within a pocket formed inside the thermoplastic layer, or is sandwiched between a first sublayer and a second sublayer of the thermoplastic layer.

In a further non-limiting embodiment of any of the foregoing vehicles, a control module is configured to regulate a temperature at the camera viewing zone of the windshield by adjusting a current flow through an inductive coil of the second inductive heating element.

In a further non-limiting embodiment of any of the foregoing vehicles, the control module includes a pulse width modulation (PWM) circuit adapted for controlling the flow of power from a power supply to the induction coil.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details windshield heating systems for induction heating windshield camera viewing zones. An exemplary windshield heating system may include a first inductive heating element imbedded within a thermoplastic layer of the windshield and a second inductive heating element mounted between a glass layer of the windshield and a camera bracket. The first and second inductive heating elements establish a wireless connection for heating the camera viewing zone of the windshield. These and other features of this disclosure are described in greater detail below.

Figure 1:
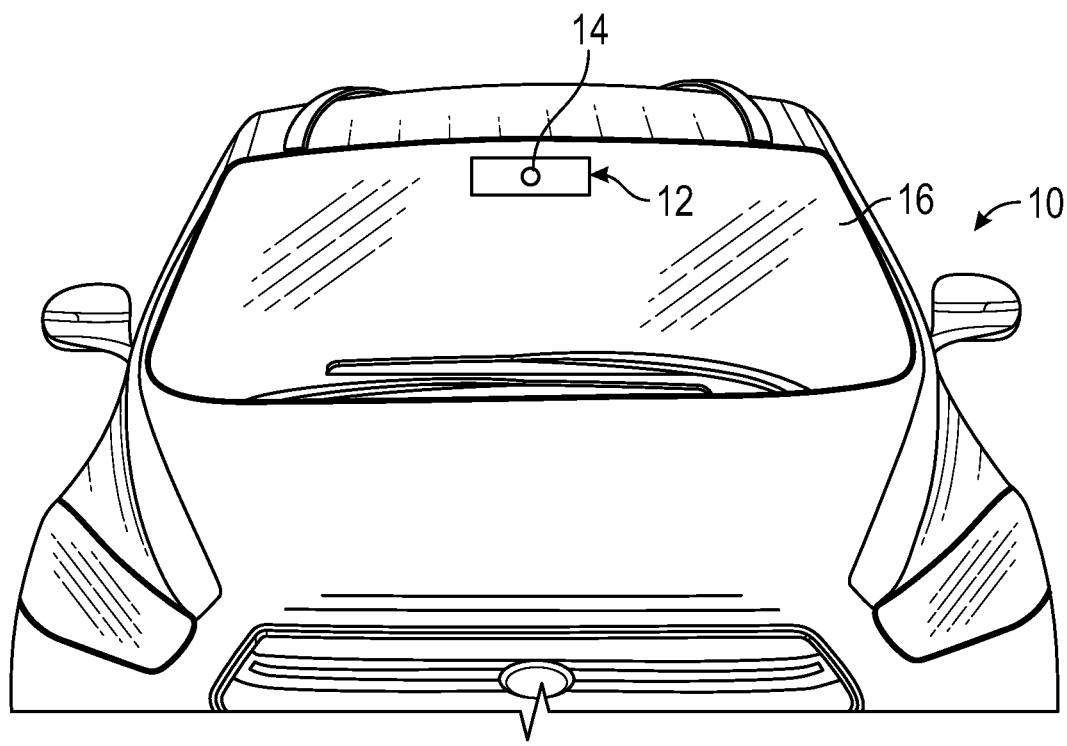
FIG. 1 is a partial front view of a motor vehicle equipped with a camera system.
Figure 2:
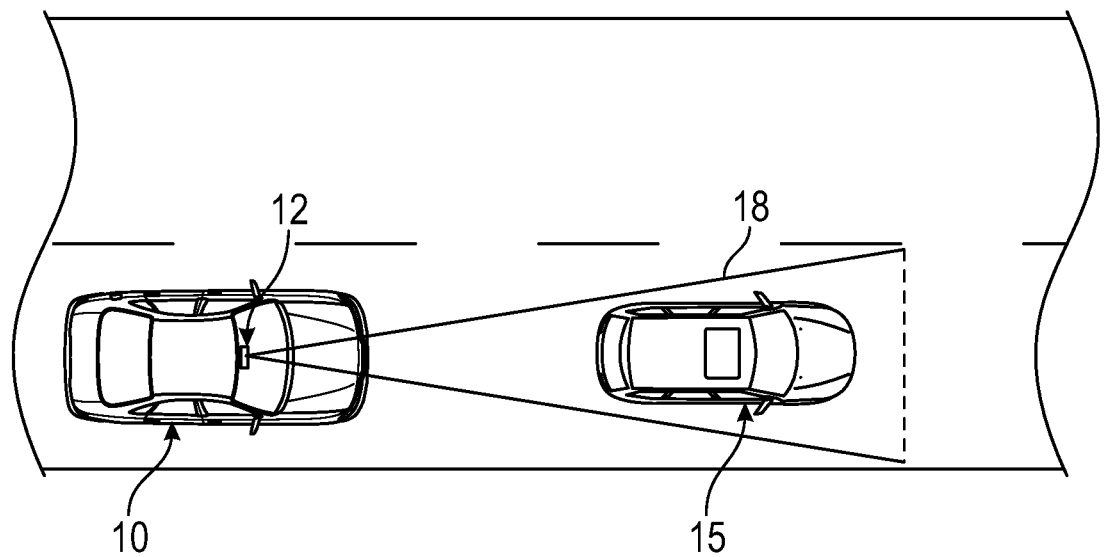
FIG. 2 schematically illustrates a field of view of the camera system of FIG. 1.

FIGS. 1 and 2 schematically illustrate an exemplary motor vehicle 10. The vehicle 10 could be a car, a truck, a van, a sport utility vehicle, or any other type of vehicle. The vehicle 10 could also be a conventional, internal combustion engine powered vehicle, a traction battery powered hybrid electric vehicle (HEV), a plug-in hybrid electric vehicle (PHEV), an autonomous vehicle, etc.

Although a specific component relationship is illustrated in the figures of this disclosure, the illustrations are not intended to limit this disclosure. The placement and orientation of the various components of the vehicle 10 are shown schematically and could vary within the scope of this disclosure. In addition, the various figures accompanying this disclosure are not necessarily drawn to scale, and some features may be exaggerated or minimized to emphasize certain details of a particular component.

The vehicle 10 includes a camera system 12. The camera system 12 may include one or more cameras 14 that are mounted relative to a windshield 16, which could be either a front windshield or a rear windshield of the vehicle 10, for example. The camera system 12 may be configured for capturing images within a field of view 18 (see FIG. 2) outside of the vehicle 10. In an embodiment, the captured images are utilized for alerting the vehicle operator when the vehicle 10 is being operated within a threshold distance relative to an object 15, such as another vehicle. The capture images could additionally be utilized for other purposes within the scope of this disclosure.

Condensation (e.g., fog, frost, ice, etc.) may periodically accumulate on the windshield 16. The condensation can reduce visibility of the camera system 12 within a camera viewing zone of the windshield 16, thereby interfering with the camera system's 12 ability to capture images within the field of view 18. This disclosure is therefore directed to windshield heating systems capable of clearing the camera viewing zone of the windshield 16 in order to allow the camera system 12 to capture clear images within the field of view 18 during all conditions.

Figure 3:
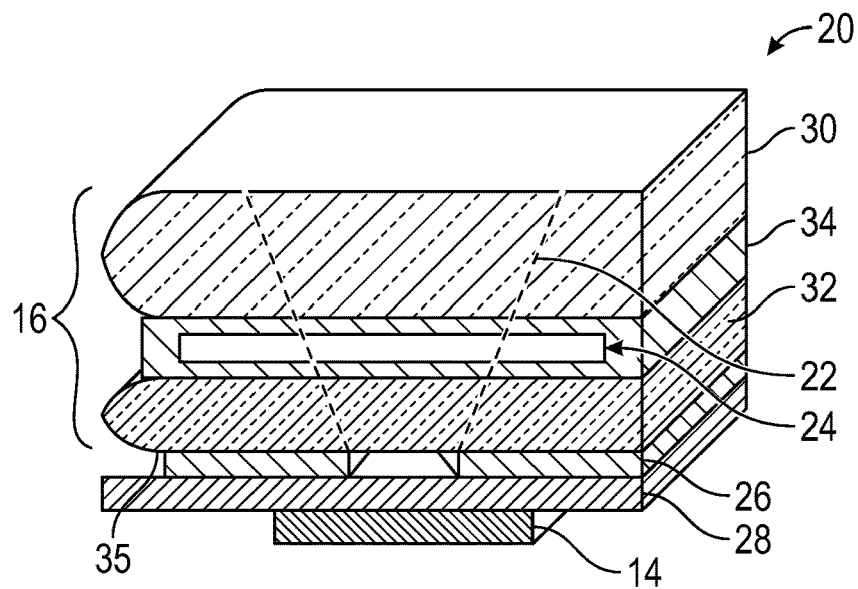
FIG. 3 is a cross-sectional view of a windshield heating system of the camera system of FIG. 1.
Figure 4:
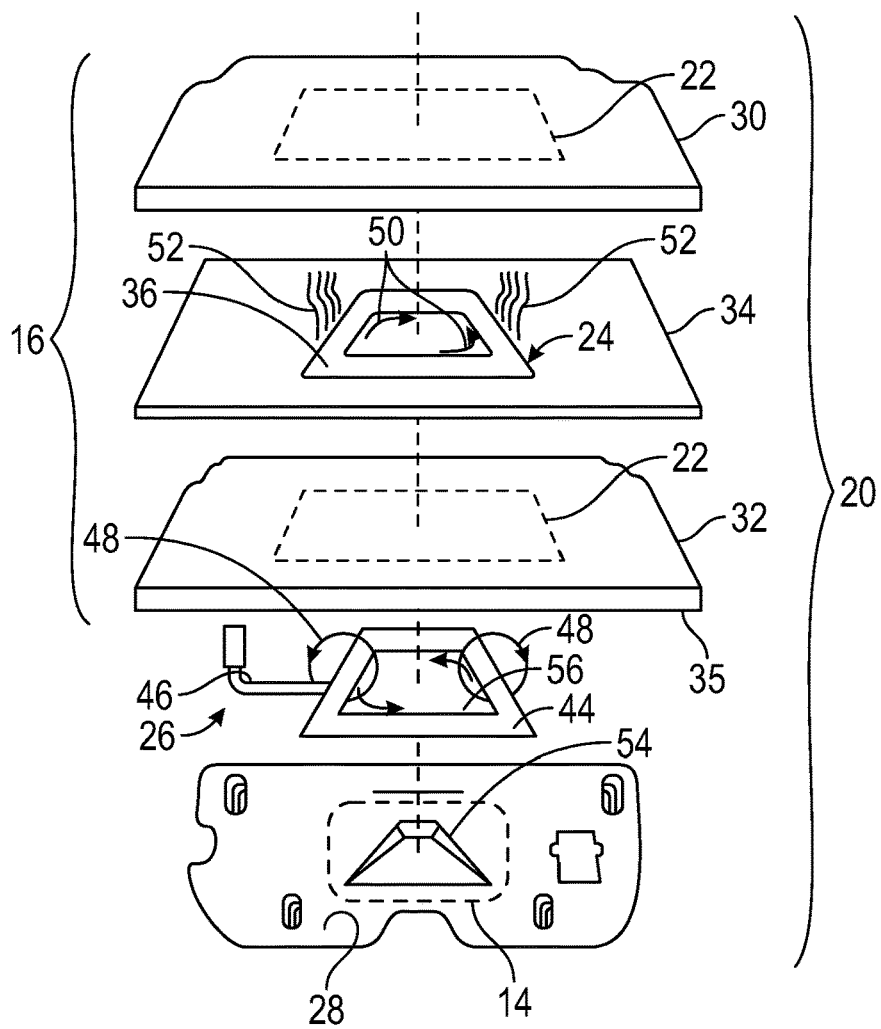
FIG. 4 is an exploded view of the windshield heating system of FIG. 3.

FIGS. 3 and 4 illustrate an exemplary windshield heating system 20 for the vehicle 10 of FIGS. 1-2. As discussed in greater detail below, the windshield heating system 20 is capable of clearing condensation from a camera viewing zone 22 associated with a camera 14 of a camera system and may include the windshield 16, a first inductive heating element 24, a second inductive heating element 26, and a camera bracket 28.

The windshield 16 is a laminated glass structure that includes a first glass layer 30 facing an exterior of the vehicle 10, a second glass layer 32 facing an interior of the vehicle 10, and a thermoplastic layer 34 sandwiched between the first glass layer 30 and the second glass layer 32. Each of the first glass layer 30, the second glass layer 32, and the thermoplastic layer 34 may be translucent to allow for the transmission of light therethrough.

The thickness of each layer of windshield 16 shown in FIGS. 3-4 has been exaggerated to better illustrate the various aspects of the windshield 16. The actual thickness of each layer is not intended to limit this disclosure, and the various thicknesses could vary from vehicle-to-vehicle to accommodate different vehicle design criteria.

The thermoplastic layer 34 may provide structural integrity for supporting the first and second glass layers 30, 32 of the windshield 16. In an embodiment, the thermoplastic layer 34 is a polyvinyl butyral (PVB) layer. In another embodiment, the thermoplastic layer 34 is an ethylene-vinyl acetate (EVA) layer. However, other thermoplastic materials could also be utilized within the scope of this disclosure.

The camera bracket 28 may be fixedly mounted to an interior surface 35 of the second glass layer 32. The camera bracket 28 supports the camera 14 relative to the windshield 16. The 14 camera may be positioned below/behind the camera bracket 28.

The first inductive heating element 24 may include a wire pattern 36 that is imbedded inside the thermoplastic layer 34 of the windshield 16. The wire pattern 36 is substantially within the surrounding mass of the thermoplastic layer 34 and therefore does not add to the overall thickness of the windshield 16. The wire pattern 36 may include one or more fine wires, wire coils, or printed wires.

Figure 5:
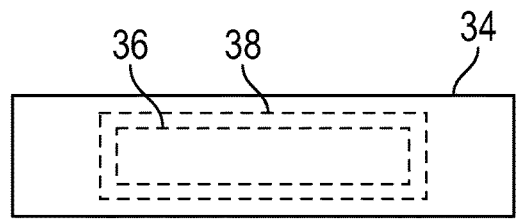
FIG. 5 illustrates an inductive heating element of a windshield heating system according to an embodiment of this disclosure.
Figure 6:
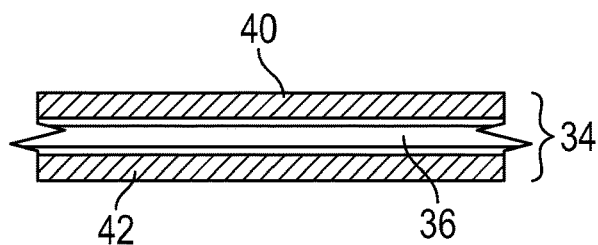
FIG. 6 illustrates an inductive heating element of a windshield heating system according to another embodiment of this disclosure.

In an embodiment, the wire pattern 36 is overmolded by the thermoplastic layer 34 and may be received within a pocket 38 formed inside the thermoplastic layer 34 (see FIG. 5). In yet another embodiment, the wire pattern 36 is sandwiched between a first sublayer 40 and a second sublayer 42 of the thermoplastic layer 34 (see FIG. 6).

The second inductive heating element 26 may include an induction coil 44 mounted between the camera bracket 28 and the interior surface 35 of the second glass layer 32. A power wire 46 may operably connect the second inductive heating element 26 to a power supply (see, e.g., feature 58 of FIG. 7) for powering the induction coil 44. When powered, the induction coil 44 is configured to generate a magnetic field 48. The magnetic field 48 generated by the induction coil 44 induces an eddy current 50 within the wire pattern 36 of the first inductive heating element 24, thereby causing the first inductive heating element 24 to generate heat 52. The heat 52 may heat both the first glass layer 30 and the second glass layer 32 for clearing condensation from the camera viewing zone 22. The first and second inductive heating elements 24, 26 are therefore configured to establish a wireless connection for heating the windshield 16.

The induction coil 44 of the second inductive heating element 26 may be disposed about a cone portion 54 of the camera bracket 28. The cone portion 54 aids to establish a full field of view of the camera 14. The cone portion 54 may protrude in a direction toward the interior of the vehicle and thus extends in a direction away from the interior surface 35 of the second glass layer 32. The camera 14 may be mounted on a surface of the camera bracket 28 that is located on an opposite side from the cone portion 54.

In an embodiment, the induction coil 44 is trapezoidal shaped and includes a through-opening 56 for accommodating the cone portion 54 of the camera bracket 28. The wire pattern 36 of the first inductive heating element 24 may be arranged in a shape that mimics that of the induction coil 44.

Figure 7:
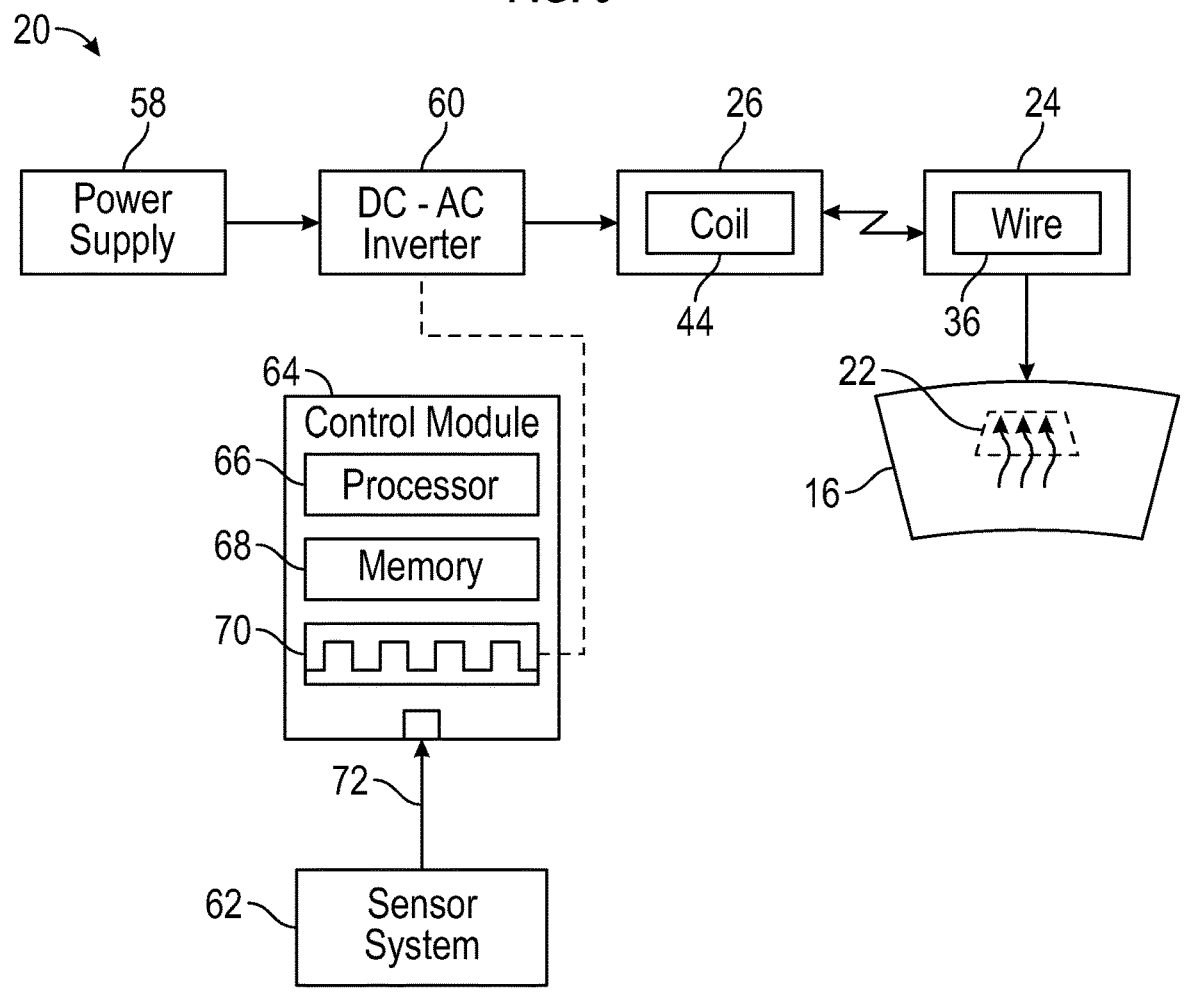
FIG. 7 is a block diagram of an exemplary windshield heating system for a vehicle equipped with a windshield-mounted camera system.

A schematic block diagram of the windshield heating system 20 is illustrated in FIG. 7 (with continued reference to FIGS. 1-4). As discussed in greater detail below, the windshield heating system 20 can be controlled to vary the amount of heat applied to the windshield 16 based on a given defrost requirement of the windshield 16.

The second inductive heating element 26 may be operably connected to a power supply 58 through a DC-AC inverter 60. The power supply 58 may be a dedicated battery of the windshield heating system 20, a low voltage battery (e.g., a 12V battery) of the vehicle 10, a high voltage traction battery of the vehicle 10, etc. The DC-AC inverter 60 is configured to convert DC power from the power supply 58 to AC power for powering the induction coil 44 of the second inductive heating element 26.

The windshield heating system 20 may further include a sensor system 62 and a control module 64. The sensor system 62 may include one or more sensors that provide input signals to the control module 64. In an embodiment, the sensor system 62 includes a thermocouple embedded within the windshield 16. In another embodiment, the sensor system 62 includes an external temperature sensor configured to sense the ambient temperature of the environment surrounding the vehicle 10. In yet another embodiment, the sensor system 62 includes both a thermocouple and an exterior temperature sensor.

The control module 64 could be either a stand-alone controller or part of an overall vehicle control system, such as a vehicle system controller (VSC), that includes a plurality of additional control modules for interfacing with and commanding operation of the various components of the vehicle 10, including the various components associated with the windshield heating system 20, over a controller area network (CAN). The control module 64 may include a processing unit 66 and non-transitory memory 68 for executing the various control strategies and modes of the windshield heating system 20.

The control module 64 may regulate the amount of heat being applied to the camera viewing zone 22 of the windshield 16 at any time by adjusting the current flowing through the induction coil 44 in order to address defrost requirements. The control module 64 may include a pulse width modulation (PWM) circuit 70 for controlling the flow of power from the power supply 58 to the induction coil 44 of the second inductive heating element 26.

The control module 64 may receive and process various inputs to achieve a desired amount of heating for reducing condensation at the camera viewing zone 22 of the windshield 16. A first input 72 to the control module may include signals from the sensor system 62. The signals may indicate the current defrost requirements of the windshield 16. The control module 64 may utilize the signals from the sensor system 62 for inferring how much power should be provided from the power supply 58 to the induction coil 44 via the DC-AC inverter 60. The DC-AC inverter 60 may be controlled to deliver the correct amount of power to the induction coil 44.

The processing unit 66 of the control module 64, in an embodiment, is configured to execute one or more programs stored in the memory 68 of the control module 64. For example, a first exemplary program, when executed, may control the PWM circuit 70 to vary the amount of power provided to the induction coil 44 from the power supply 58 based on the feedback from the sensor system 62. For example, as the ambient temperature decreases, the amount of power provided to the induction coil 44 may be automatically increased in order to maintain the camera viewing zone 22 of the windshield 16 within a target temperature range for clearing condensation therefrom. A pre-calculated current that corresponds to each possible detected temperature value may be stored in the memory 68 of the control module 64, such as in one or more look-up tables. The control module 64 can accurately select the correct current to be applied to the induction coil 44 for generating a magnetic field that induces a current in the wire pattern 36 of the first inductive heating element 24 for any given temperature by referencing the look-up table.

The windshield heating systems described herein provide an improved wireless heating performance of the windshield camera viewing zone. The proposed systems further provide improved craftsmanship while maintaining glass optical requirements.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A windshield heating system for a motor vehicle, comprising:
   a windshield including a first glass layer, a second glass layer, and a thermoplastic layer between the first and second glass layers;
   a first inductive heating element imbedded within the thermoplastic layer; and
   a second inductive heating element positioned at an interior surface of the second glass layer,
   wherein the first and second inductive heating elements cooperate to wirelessly heat a camera viewing zone of the windshield.

2. The windshield heating system as recited in claim 1, wherein the thermoplastic layer is a polyvinyl butyral (PVB) layer.

3. The windshield heating system as recited in claim 1, wherein the thermoplastic layer is an ethylene-vinyl acetate (EVA) layer.

4. The windshield heating system as recited in claim 1, wherein the first inductive heating element includes a wire pattern imbedded within the thermoplastic layer.

5. The windshield heating system as recited in claim 4, wherein the wire pattern includes a fine wire, a printed wire, or a wire coil.

6. The windshield heating system as recited in claim 4, wherein the wire pattern is arranged within a pocket formed inside the thermoplastic layer.

7. The windshield heating system as recited in claim 4, wherein the wire pattern is sandwiched between a first sublayer and a second sublayer of the thermoplastic layer.

8. The windshield heating system as recited in claim 1, comprising a control module configured to regulate a temperature at the camera viewing zone of the windshield by adjusting a current flow through an inductive coil of the second inductive heating element.

9. The windshield heating system as recited in claim 1, wherein the second inductive heating element includes an induction coil received between the interior surface of the second glass layer and a camera bracket.

10. The windshield heating system as recited in claim 9, wherein the induction coil is received over a cone portion of the camera bracket.

11. The windshield heating system as recited in claim 9, wherein the induction coil is trapezoidal shaped.

12. The windshield heating system as recited in claim 11, wherein a wire pattern of the first inductive heating element is arranged to include a shape that mimics that of the induction coil.

13. A windshield heating system for a motor vehicle, comprising:
    a windshield including a first glass layer, a second glass layer, and a thermoplastic layer between the first and second glass layers;
    a first inductive heating element imbedded within the thermoplastic layer;
    a second inductive heating element positioned at an interior surface of the second glass layer,
    wherein the first and second inductive heating elements cooperate to wirelessly heat a camera viewing zone of the windshield;
    a sensor system configured to monitor a temperature associated with the windshield or ambient air surrounding the windshield; and
    a control module configured to adjust a current flow through the second inductive heating element based on the temperature.

14. The windshield heating system as recited in claim 13, wherein the control module includes a pulse width modulation (PWM) circuit adapted for controlling the flow of power from a power supply to an induction coil of the second inductive heating element.

15. The windshield heating system as recited in claim 14, comprising a DC-AC inverter operably connecting the power supply to the second inductive heating element.

16. A vehicle, comprising:
    a windshield including a first glass layer that faces toward an exterior of the vehicle, a second glass layer that faces toward an interior of the vehicle, and a thermoplastic layer disposed between the first and second glass layers;
    a first inductive heating element imbedded within the thermoplastic layer;
    a second inductive heating element positioned between an interior surface of the second glass layer and a camera bracket; and
    a camera mounted to the camera bracket,
    wherein the first and second inductive heating elements cooperate to wirelessly heat a camera viewing zone of the windshield.

17. The vehicle as recited in claim 16, wherein the thermoplastic layer is a polyvinyl butyral (PVB) layer or an ethylene-vinyl acetate (EVA) layer.

18. The vehicle as recited in claim 16, wherein the first inductive heating element includes a wire pattern that is overmolded by the thermoplastic layer and arranged within a pocket formed inside the thermoplastic layer, or is sandwiched between a first sublayer and a second sublayer of the thermoplastic layer.

19. The vehicle as recited in claim 16, comprising a control module configured to regulate a temperature at the camera viewing zone of the windshield by adjusting a current flow through an inductive coil of the second inductive heating element.

20. The vehicle as recited in claim 19, wherein the control module includes a pulse width modulation (PWM) circuit adapted for controlling the flow of power from a power supply to the induction coil.

* * * * *